United States Patent [19]

Lin

[11] 3,925,768

[45] Dec. 9, 1975

[54] GAPLESS DOUBLE-SIDED PROPAGATION STRUCTURE FOR BUBBLE DOMAIN DEVICES

[75] Inventor: Yeong S. Lin, Mount Kisco, N.Y.

[73] Assignee: International Business Machines Corporation, Armonk, N.Y.

[22] Filed: Dec. 27, 1973

[21] Appl. No.: 429,000

[52] U.S. Cl. .................... 340/174 TF; 340/174 SR

[51] Int. Cl.[2] .................. G11C 11/14; G11C 19/08

[58] Field of Search ................ 340/174 TF, 174 SR

[56] References Cited

UNITED STATES PATENTS

| | | | |
|---|---|---|---|
| 3,516,077 | 6/1970 | Bobeck et al. | 340/174 TF |
| 3,644,908 | 2/1972 | Bobeck | 340/174 TF |
| 3,845,477 | 10/1974 | Le Craw et al. | 340/174 TF |

*Primary Examiner*—Stanley M. Urynowicz, Jr.
*Attorney, Agent, or Firm*—Sughrue, Rothwell, Mion, Zinn & Macpeak

[57] ABSTRACT

Gapless, double-sided propagation structures are provided for implementing the continuous movement of magnetic bubble domains under the control of a reorienting in-plane field. Propagation is achieved by using two identical disc circuits on both sides of the bubble material displaced from each other by one-half of periodicity. The discs in each circuit are disposed in tangential engagement with each other and the two circuits may follow any desired path provided the circuits are in alignment with each other.

13 Claims, 3 Drawing Figures

GAPLESS DOUBLE-SIDED PROPAGATION STRUCTURE FOR BUBBLE DOMAIN DEVICES

BACKGROUND OF THE INVENTION

1. Field of the Invention

The present invention relates to magnetic bubble domain devices and more particularly, to gapless propagation structures for implementing the controlled movement of magnetic bubble domains in a supporting medium.

2. Prior Art

In the new and rapidly developing field of technology relating to magnetic bubble domains, the preferred means for implementing the controlled movement of bubbles within a magnetic medium such as a platelet or layer of orthoferrite or garnet material, etc., has involved the use of overlay strips of permalloy or the like. These strips are magnetically soft, are adjacent to the platelet or layer, and serve to channel and concentrate the flux from a rotating in-plane magnetic field. This concentration produces poles at the ends of the strips when they are aligned with the rotating field and these poles attract or repel the bubbles depending upon the polarity thereof to thereby control their movement.

The permalloy structures currently in use include the T-I bar, Y-I bar, Y-Y bar and chevron patterns and rely on gaps between the bars to provide a continuous flow of bubbles around the structures in the presence of a rotating or pulse-sequenced magnetic field.

The gapped permalloy patterns are characterized by a number of major disadvantages. For one, the bubble diameter must be substantially larger (typically two-times larger) than the gap width in order to traverse it. This reduces the density of storage which can be achieved for a given line width because unwanted magnetic interactions between bubbles require that bubbles be separated by distances greater than $k$D, where D is the bubble diameter and $k$ is a device sensitive parameter, typically about 4. In addition, a bubble must be elevated to a higher energy state to traverse a gap, which renders it momentarily less stable and thus, more likely to collapse, split, or otherwise behave in an erratic manner, thus reducing device operating margins. Finally, the close dimensional tolerances that must be maintained at the gaps makes the fabrication of the permalloy overlays more difficult and increases the likelihood of serious propagation errors occurring at the gaps.

Several propagation structures which are generally of a gapless form have been proposed in the prior art as typified by U.S. Pat. Nos. 3,516,077 (Tangent Discs on Alternately Opposite Sides of a Platelet), 3,518,643 (Zig-Zag Strip), and 3,644,908 (Sinuous Strip Alongside a Straight Strip). All of these structures have a number of disadvantages such as low packing density and the ability to implement bubble movement in only a single direction. Furthermore, U.S. Pat. No. 3,516,077 which uses spaced discs on opposite sides of the platelet also requires the use of a permalloy rail to prevent the bubbles from circulating around the permalloy disc. Also, because of the gaps between the discs and the permalloy rail, it is impossible to significantly reduce the cell size so that the structure is merely an alternative of the conventional T-I bar circuits.

Accordingly, it is a primary object to provide a gapless propagation structure for movement of magnetic bubble domains in a plurality of directions.

It is another object of this invention to provide bubble domain storage cells having extremely high density.

It is still another object of this invention to provide improved magnetic bubble domain propagation in a plurality of directions.

SUMMARY OF THE INVENTION

The present invention obviates the above-noted disadvantages attendant with the prior art constructions by providing a gapless double-sided propagation structure of permalloy or the like, which enables the continuous movement of magnetic bubbles along both straight line and curved paths in response to an in-plane rotating or pulse-sequenced magnetic field.

The present invention provides a propagation structure which is capable of improving the stepwise density of magnetic bubbles by a factor of 64 over the conventional T-I bar circuits. In the present propagation structure, the cell size is (W)(W), where W is the line width of a propagation element. In this structure, $W=4d$ ($d=$ bubble domain diameter), in order to achieve bubble domain separation of $4d$.

To accomplish the foregoing objects of the present invention, a gapless double-sided propagation structure is provided by placing two identical superimposed patterns on opposite sides of the bubble domain medium wherein each pattern is comprised of a plurality of contiguous discs. The discs in the pattern or circuit on one side of the magnetic medium are offset from the discs in the pattern or circuit on the opposite side of the medium by one-half of periodicity. The pattern or circuit of contiguous discs may take any desired form such as a straight line, curved line, or the like.

The propagation structures can be comprised of magnetically soft material such as permalloy. Also, ion implanted or diffused regions in the magnetic material can be used to define the propagation patterns. Another alternative is to use apertures in a magnetically soft layer to define the propagation structure. All of these techniques are known in the art and can be utilized to provide the propagation patterns of the present invention.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
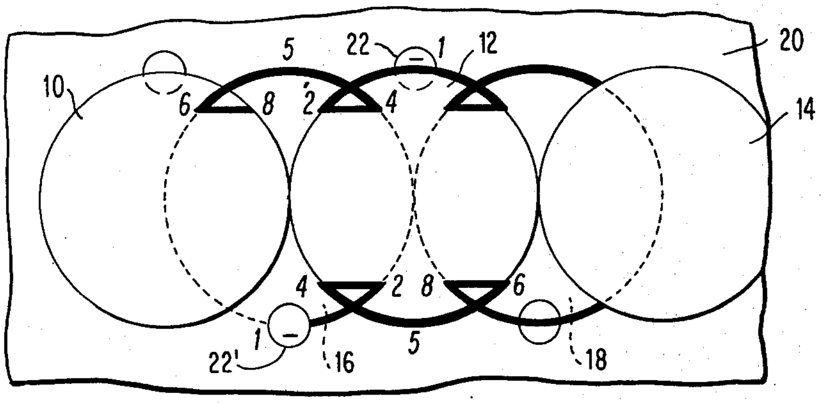
FIG. 1 is a partial top plan view of a gapless double-sided propagation structure in accordance with the present invention.

Referring to the drawing, FIG. 1 shows three contiguous discs 10, 12 and 14 of, for instance, permalloy or other magnetically soft material, in a line tangential engagement with each other on the upper surface of a magnetic medium 20 of orthoferrite, garnet or other suitable material. Two similar discs 16 and 18, shown in dotted lines, are disposed in tangential contact with each other on the undersurface of the medium 20. As clearly shown in FIG. 1, the row of discs 10, 12 and 14 on the upper surface of the medium 20 is in alignment with the row of discs 16 and 18 on the undersurface of the medium 20 but the individual discs on the undersurface are offset from the individual discs on the upper surface by one-half of periodicity. For the purposes of description and understanding, it will be assumed that the plane of the drawing paper represents the upper surface of the magnetic medium and that a magnetic field of sufficient magnitude to support bubble domains extend perpendicularly to the surface of the paper so that the uppermost ends of the cylindrical bubbles 22 which are disposed in the plane of the paper will have a negative polarity as indicated. The discs are adjacent to the magnetic medium, or can be slightly spaced therefrom by an insulating layer. In the case of ion implanted discs, the discs are formed in the surface of the bubble domain medium 20. When the aperture technique is used to provide the discs, the discs 10, 11 and 12 are apertures in a layer of magnetically soft material adjacent to medium 20.

Figure 2:
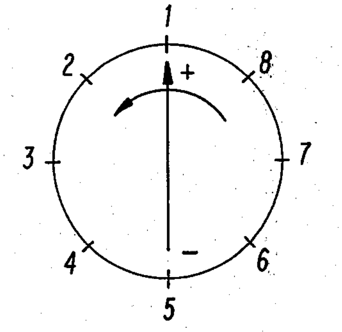
FIG. 2 shows a rotating magnetic field vector for propagating magnetic bubble domains in the pattern shown in FIG. 1 relative to the discs on the upper surface of the bubble domain magnetic medium.
Figure 3:
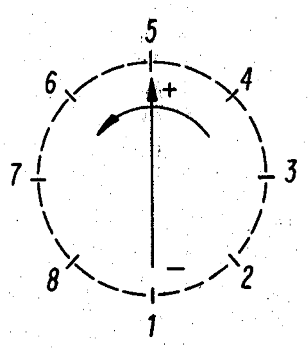
FIG. 3 shows a rotating magnetic field vector for propagating magnetic bubble domains by the pattern shown in FIG. 1 relative to the discs on the undersurface of the magnetic medium.

For convenience, the numerals 1–8 have been placed at various points along the opposite edges of the discs to indicate the presence of a positive pole when the propagation field vector of FIGS. 2 and 3 is disposed at similarly numbered rotational phase positions. It must be remembered that the cylindrical bubble 22 has a positive polarity at the end thereof adjacent to the discs 16 and 18 disposed on the undersurface of the medium 20.

A plurality of bubbles may be moved simultaneously in a continuous path around the outer peripheries of the discs but for the purpose of the present discussion, only the movements of two representative bubbles 22 and 22′ will be discussed in detail. With the propagation field vector disposed in the position shown in FIG. 2, the disc 12 will be positive at position 1 and since the end of the bubble 22 adjacent the upper surface of the medium 20 is negative, the bubble 22 will be positioned at position 1 as shown in FIG. 1. As the propagation field vector rotates to position 2, the bubble will also be moved to position 2 around the circumference of the disc 12. As the propagation field vector continues to rotate on toward position 3, the opposite end of the propagation field vector will also begin to approach position 3 in FIG. 3. Thus, the portion of the lower disc 16 adjacent its point of tangency with lower disc 18 will become increasingly negative. As a result, by the time the propagation field vector in FIG. 2 reaches position 3, the positive end of the bubble will be sufficiently under the influence of the negative polarity of the lower disc 16 so as to prevent further movement of the bubble in a counterclockwise direction around the periphery of the disc 16.

As the propagation field vector in FIG. 2 moves to position 4, the interaction between the negative charge on the lower disc 16 and the positive charge at the lower end of the bubble 22, will be sufficient to move the bubble to the position indicated at 4 in FIG. 1. Continued rotation of the propagation field vector to the positions 5 and 6 will thus move the bubble in a counterclockwise direction around the periphery of the lower disc 16. As the vector approaches position 7, the same phenomenon will take place as previously described with respect to the approach to position 3 and the influence of the positive charge on the upper disc 10 relative to the upper negative end of the bubble 22 will increase and when the vector reaches position 8, the bubble 22 will have been shifted from the periphery of the lower disc 16 at position 6 to the periphery of the upper disc 10 at position 8. The vector will then return to position 1 and the bubble 22 will be in a position on disc 10 corresponding to its previous position 1 on disc 12. The path along which the bubble travels is shown as a heavy line and the movement of the bubble 22 will be substantially continuous except for the lag noted at positions 3 and 7 of the propagation field vector.

Simultaneously with the movement of the bubble 22, a second bubble 22′ will be moving in the opposite direction along the opposite side of the series of discs. Although the uppermost end of the bubble 22′ is shown as having a negative charge, the lower end of the bubble adjacent the discs 16 and 18 on the undersurface of the medium 20 has a positive charge which at position 1 as shown in FIG. 3 will be under the influence of the negative end of the propagation field vector. The movement of the bubble 22′ along the heavily lined path through positions 1, 2, 4, 5, 6 and 8 will be identical to that described above with respect to bubble 22.

After bubble 22 leaves the position 8 and begins to travel about the periphery of the disc 10 in a counterclockwise direction, the bubble will travel completely around the periphery of the disc until it comes under the influence of the charge on the lower disc 16. By providing an equal number of discs on the upper and lower surfaces of the medium 20 or one additional disc on either surface, a plurality of bubbles can be constrained to travel along a closed path in a counterclockwise direction about the periphery of the chain of discs. Although the chain of discs has been illustrated in FIG. 1 as being disposed in a straight line, it is conceivable that the discs could be disposed along a slightly curved path. The reversal of the field vector rotation from a counterclockwise rotation as indicated in FIGS. 2 and 3 to a clockwise rotation would cause reversal of the direction of bubble movement along the chain of discs.

The practical utilization of the propagation structure disclosed herein, could be accomplished in the usual manner with the presence of a bubble representing a logical "one" and the absence of a bubble representing a logical "zero". Sensing could be implemented by a magneto-resistive or other well known means. The loops as described above could be employed as minor recirculating loops in a mass memory with control lines provided to generate field gradients of sufficient strength to pull selected bubbles from the minor loops to an interconnecting major loop and vice versa.

As an illustrative example, a 20 bit closed loop shift register, using 15 micron bubble domains in a garnet bubble domain medium, was successfully built and tested. The discs used for propagation were 60 microns in diameter, and were comprised of permalloy.

To achieve maximum storage density, assuming that bubble domains should be separated from one another by about 4 bubble domain diameters ($d$), the diameter of each disc is chosen to be $W = 4d$, where W is the line width of the disc. This provides a unit cell size of (W)(W), which is 64 times less than that achieved with standard T-I bar circuits. This extremely high density is achieved with a structure that is easy to fabricate, and can utilize many well known techniques. While circular disks have been conveniently utilized, it is anticipated that other double-sided structures can also be used, where these are spatially displaced from one another by one-half periodicity, and where the elements are comprised of curved portions along which the bubble domains travel.

While the invention has been particularly shown and disclosed with reference to a preferred embodiment thereof, it will be understood by those in the art that various changes in form and detail may be made therein without departing from the spirit and scope of the invention.

What is claimed is:

1. A gapless, double-sided propagation structure for implementing the continuous movement of magnetic bubble domains in a supporting material in response to a reorienting in plane magnetic field comprising a plurality of discs of magnetically soft material disposed in contiguous relation to each other on one surface of said supporting material and a plurality of discs of magnetically soft material disposed in contiguous relationship to each other on the opposite side of said supporting material in aligned relation to said discs on said one side but offset therefrom by one-half of periodicity.

2. A gapless propagation structure as set forth in claim 1 wherein the number of discs on said one side are equal to the number of discs on said other side.

3. A gapless propagation structure as set forth in claim 1 wherein the number of discs on one side of said material is one greater than the number of discs on the opposite side of said material.

4. A propagation structure for moving magnetic bubble domains in a supporting medium, comprising:

a magnetic medium in which said bubble domains can move, a propagation means adjacent to said magnetic medium comprised of a first continuous portion adjacent to one surface of said medium and a second continuous portion adjacent to an opposing surface of said medium, said first and second portions being comprised of laterally displaced elements having a generally curved geometry, said first and second portions being displaced from one another in the direction of bubble domain movement.

5. The structure of claim 4, where said elements in said first and second portions have the same periodicity of spatial arrangement.

6. The structure of claim 4, where said elements are generally circular in shape.

7. A structure, comprising:

a magnetic medium in which magnetic domains can be propagated, a propagation means for moving said domains in said medium, said means including a first portion comprised of curved elements disposed in a first row with the curvature of the elements lying in a plane parallel to said magnetic medium adjacent ones of said elements being in contact with one another and a second portion comprised of curved elements disposed in a second row with the curvature of the elements lying in a plane parallel to said magnetic medium, adjacent ones of said elements in said second row being in contact with one another, the curved elements of said first and second portions being laterally displaced with respect to one another along an axis of movement of said domains in said magnetic medium.

8. The structure of claim 7, where said elements have generally disc shapes.

9. A gapless, double-sided propagation structure for moving magnetic bubble domains in a supporting material in response to a reorienting in-plane magnetic field applied to said material comprising a plurality of disk shaped elements disposed in contiguous relation to each other adjacent one surface of said material and a plurality of disk shaped elements disposed in contiguous relationship to each other adjacent an opposing surface of said material, said plurality of disks adjacent one surface of said material being aligned with said plurality of disks adjacent said other surface but offset therefrom in the general direction of bubble domain movement.

10. The structure of claim 9, where said disks on each side of said material have the same periodicity, said offset being about one-half of said periodicity.

11. The structure of claim 9, where the number of disks on one side of said material is equal to the number of disks on the opposing side of this said material.

12. The structure of claim 9, where said disks are comprised of magnetically soft material.

13. The structure of claim 12, wherein the number of disk shaped elements on one side of said material is greater than the number of disk shaped elements on the opposing side of said material.

* * * * *